United States Patent
Schwab et al.

(10) Patent No.: US 7,538,960 B2
(45) Date of Patent: May 26, 2009

(54) AIR BEARING GUIDED ZOOM LENS FOR METROLOGICAL MEASUREMENTS

(75) Inventors: Fred J. Schwab, Churchville, NY (US); Boris Gelman, Fairport, NY (US)

(73) Assignee: Quality Vision International, Inc., Rochester, NY (US)

( * ) Notice: Subject to any disclaimer, the term of this patent is extended or adjusted under 35 U.S.C. 154(b) by 268 days.

(21) Appl. No.: 11/374,736

(22) Filed: Mar. 14, 2006

(65) Prior Publication Data

US 2007/0217037 A1 Sep. 20, 2007

(51) Int. Cl.
*G02B 7/02* (2006.01)

(52) U.S. Cl. .......................... 359/822; 359/819; 359/823

(58) Field of Classification Search .................. 359/600, 359/694–706, 800, 811–830, 196–210
See application file for complete search history.

(56) References Cited

U.S. PATENT DOCUMENTS

| | | | | |
|---|---|---|---|---|
| 4,611,403 A * | 9/1986 | Morita et al. | ................. | 33/558 |
| 5,083,379 A * | 1/1992 | Enderle et al. | ................. | 33/556 |
| 5,159,563 A * | 10/1992 | Miller et al. | ................. | 702/35 |
| 6,507,705 B1 * | 1/2003 | Kasha | ........................ | 396/72 |
| 2005/0184036 A1 * | 8/2005 | Hunter et al. | .......... | 219/121.69 |
| 2005/0199598 A1 * | 9/2005 | Hunter et al. | .......... | 219/121.72 |

OTHER PUBLICATIONS

Devitt, A.J., "Porous VS. Orifice Air Bearing Technology" Apr. 2, 1999. Newway Air Bearings.*
Newway® air bearings: http://www.newwayairbearings.com/air-Bushings-English (2 pages) Mar. 31, 2008.

* cited by examiner

*Primary Examiner*—Jessica T Stultz
*Assistant Examiner*—Mahidere S Sahle
(74) *Attorney, Agent, or Firm*—Dominic P. Ciminello, Esq.; Stephen B. Salai, Esq.; Harter Secrest & Emery LLP

(57) ABSTRACT

A zoom lens guide system employs air bearings to reduce mechanical shift of the zoom lens components, thus reducing measurement error. The air bearings provide greater stiffness, resulting in the reduction of mechanical shift. Orifice type or porous media air bearings can be used to provide a thin film between an external surface of the bearing and an inner surface of a barrel of the system, the bearing being mounted about a lens housing within the barrel. Guide pins include feed tubes connect the air bearings to an air supply while engaging a guide slot in the barrel and a cam slot in a zoom ring to effect selective axial motion of a lens housing.

21 Claims, 7 Drawing Sheets

AIR BEARING GUIDED ZOOM LENS FOR METROLOGICAL MEASUREMENTS

BACKGROUND AND SUMMARY

This invention relates to optical lens zoom systems, and more particularly to an improved guiding mechanism for controlling the moving parts or elements in such a lens system. It has long been customary in zoom lens systems of the type described, to employ ball bearing rollers for guiding moving parts of a zoom lens within the lens barrel. It has also been customary heretofore to employ in such lens barrel various parts which are mounted for sliding movement relative to each other to effect variation in magnification of an observed object. Lenses of the type described are frequently employed in motion picture photography and television broadcasting, which usually demand the highest of image quality. Typically such a zoom lens system includes in the lens barrel two moveable sets of lenses, the first or forward group of lenses being disposed to vary the angle of view, the second set being operative to restore the focus upon adjustment of the first group.

Among the disadvantages or prior such zoom lenses has been the difficulty encountered in accurately, and in some instances quietly, moving the respective sets of lenses. Such prior art devices also require a nearly polished finish on the inner bore wall of the lens barrel, thus contributing significantly to the manufacturing costs of the lens systems.

Accordingly, it is an object of this invention to provide an improved optical zoom lens system of the type described in which the lenses can be moved accurately and with precision not heretofore available.

Still another object of this invention is to provide an improved guiding mechanism for moving parts of an optical zoom lens system of the type described, which mechanism is easier to manufacture and is longer lasting than prior such guiding mechanisms.

Other objects of the invention will be apparent hereinafter from the specification and from the recital of the appended claims, particularly when read in conjunction with the accompanying drawings.

In typical metrological setups, mechanical bearings are used to support and actuate a zoom lens. However, mechanical shift of the zoom components can generate an optical images shift that is an error of measurement in the optical measuring machine. Various designs of mechanical bearings have been made to attempt to overcome this problem, but the shift and resultant error remain. For example, U.S. Pat. No. 6,507,705 to Kasha, the disclosure of which is hereby incorporated by reference in its entirety, discloses one of the most accurate guiding mechanisms available for moving parts in a zoom lens system. The tubular barrel of a zoom lens mechanism has secured in the bore thereof a plurality (three in the embodiment illustrated) of elongate, circular rods which are secure to the inner peripheral surface of the barrel to extend axially thereof and in angularly spaced relation to each other. Each of a plurality of cylindrically shaped lens housings are mounted coaxially in the bore of the barrel for axial adjustment therein by means of a plurality of sets of rollers on each housing, each of which sets on each housing has rolling, point engagement with a different one of the rails. One set of rollers on each housing is urged resiliently into rolling engagement with the associated rail, while the other two sets of rollers in such housing are rotatable about axes which are fixed with respect to the associated housing. Each housing has thereon a pin which projects through a slot in the barrel and into a cam groove formed in one of two different zoom or camming rings which are rotatably mounted on the barrel. The rolling point contact between the rails and the rollers on the housing, significantly improve the accuracy and life of the mechanism. However, even this system can suffer measurement error when mechanical shift of its mechanical bearings occurs.

Embodiments offer an alternative to the mechanical bearings of the prior art. Air bearings are used in embodiments to guide a zoom lens, eliminating mechanical bearings and the related mechanical and image shift. The air bearings have higher stiffness than the mechanical bearings of the prior art, minimizing the shift of moving components in the lens system. Thus, the zoom lens system guided by an air bearing system results in greater accuracy, overcoming the problems of the prior art.

DETAILED DESCRIPTION

Figure 1:
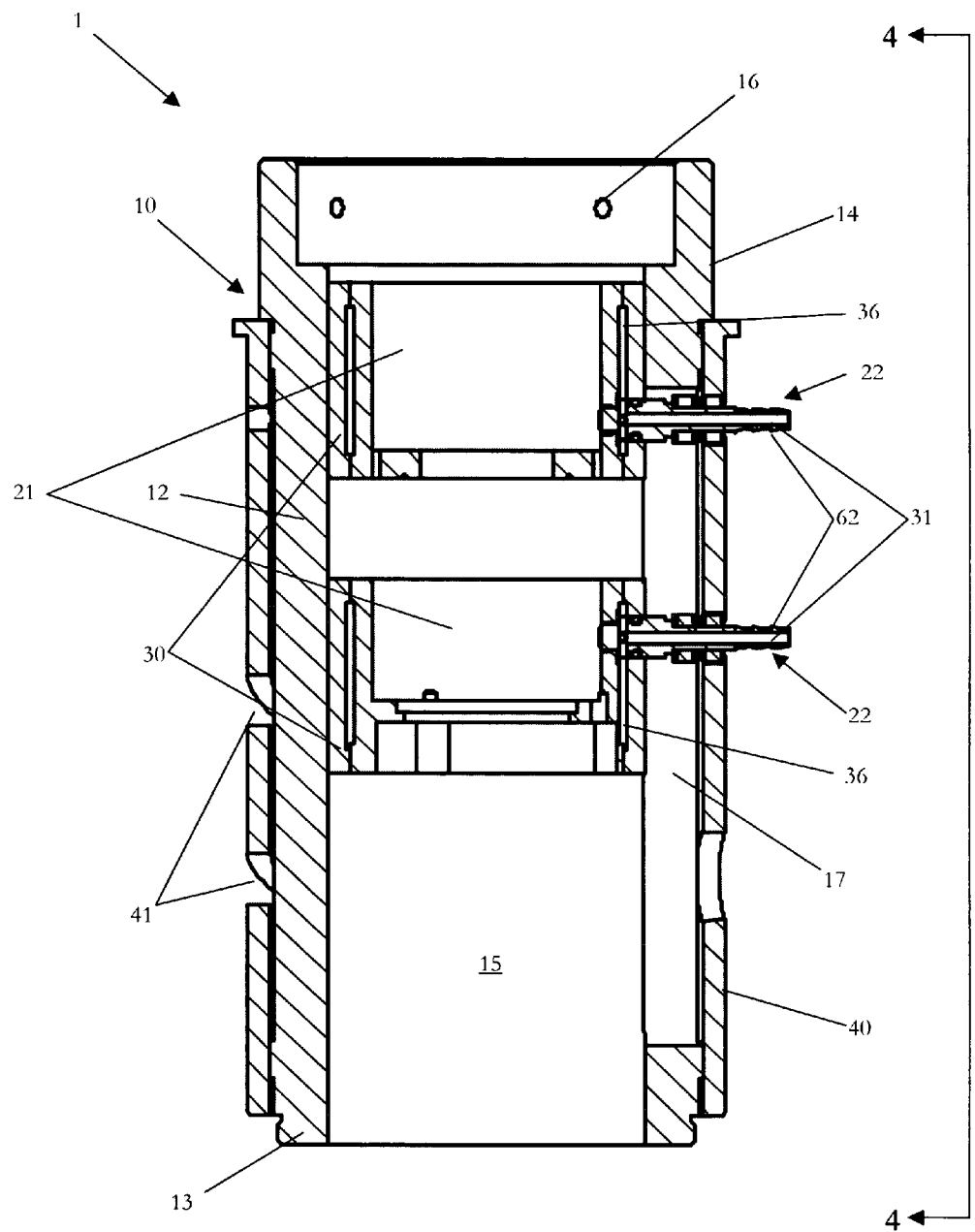
FIG. 1 is a cross sectional view of an elongate cylindrical lens barrel according to embodiments containing two zoom lens housings or cells and the improved mechanism for adjusting the housings longitudinally of the lens barrel, the zoom ring containing the cam slots for manipulating the lens housings being shown only fragmentarily.
Figure 2:
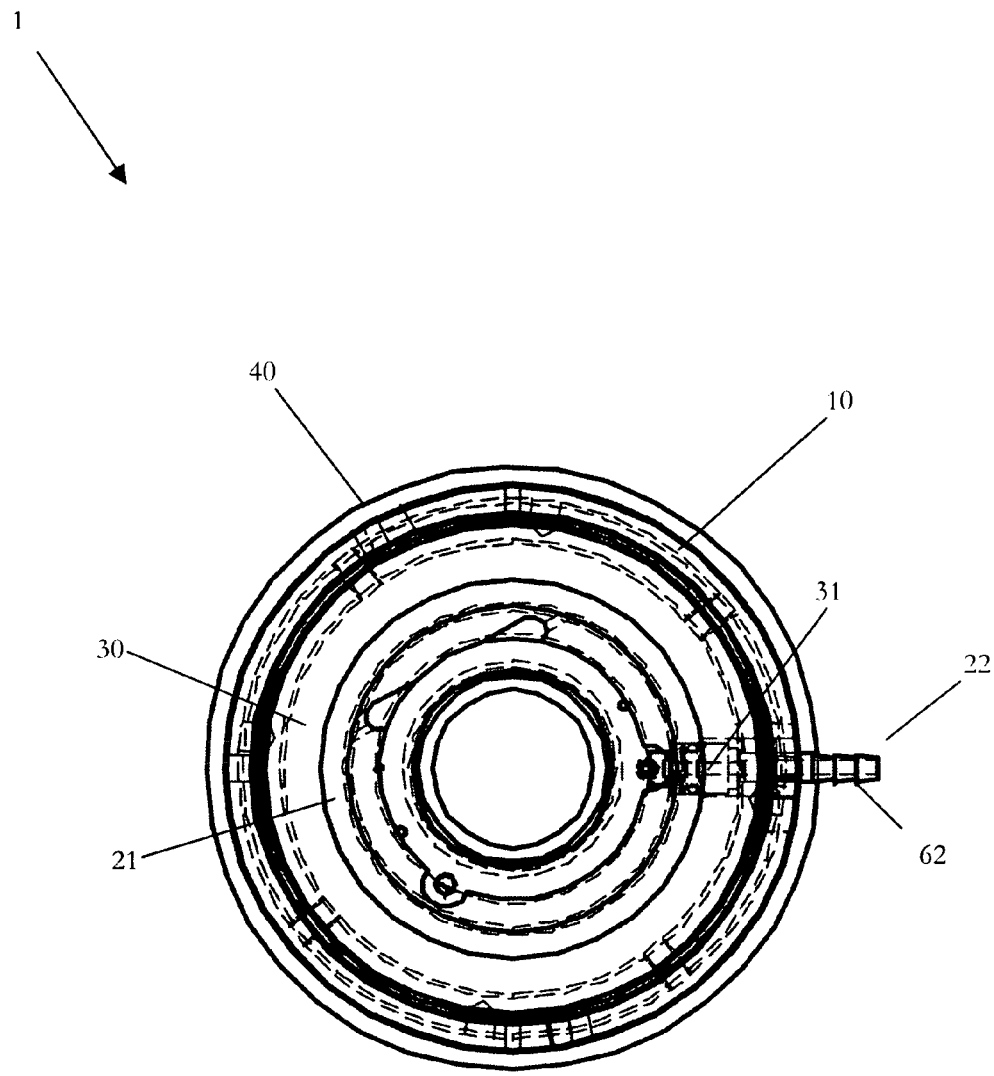
FIG. 2 is an end view of the lens barrel and associated parts as seen when looking in the lower end of the lens barrel as shown in FIG. 1.
Figure 3:
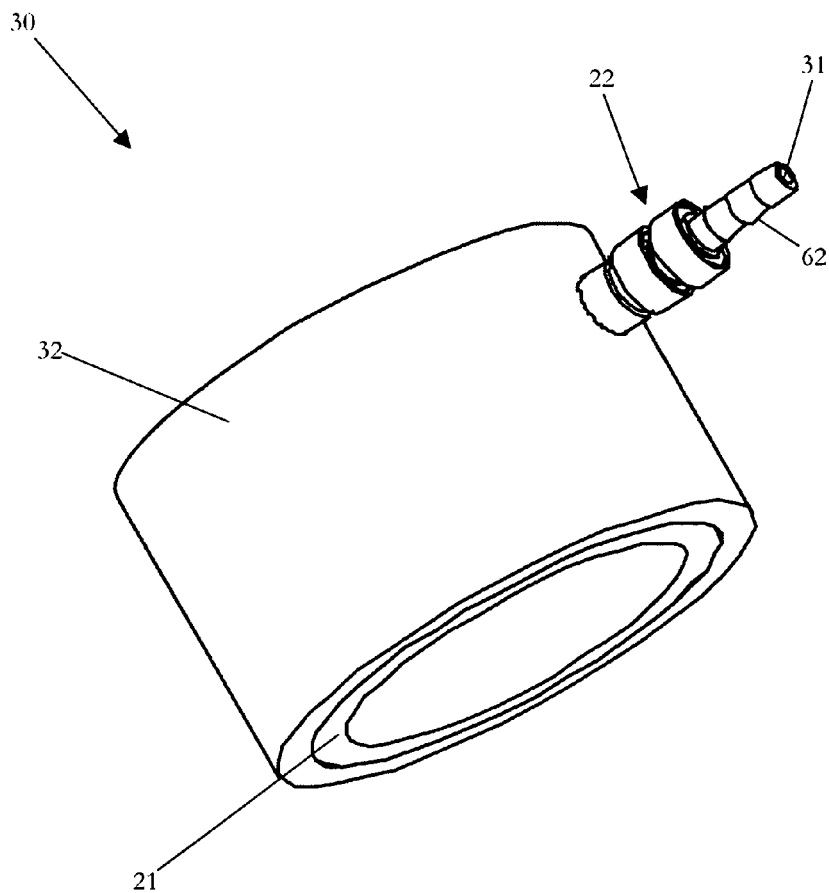
FIG. 3 is an elevation of an air bearing used in embodiments.
Figure 4:
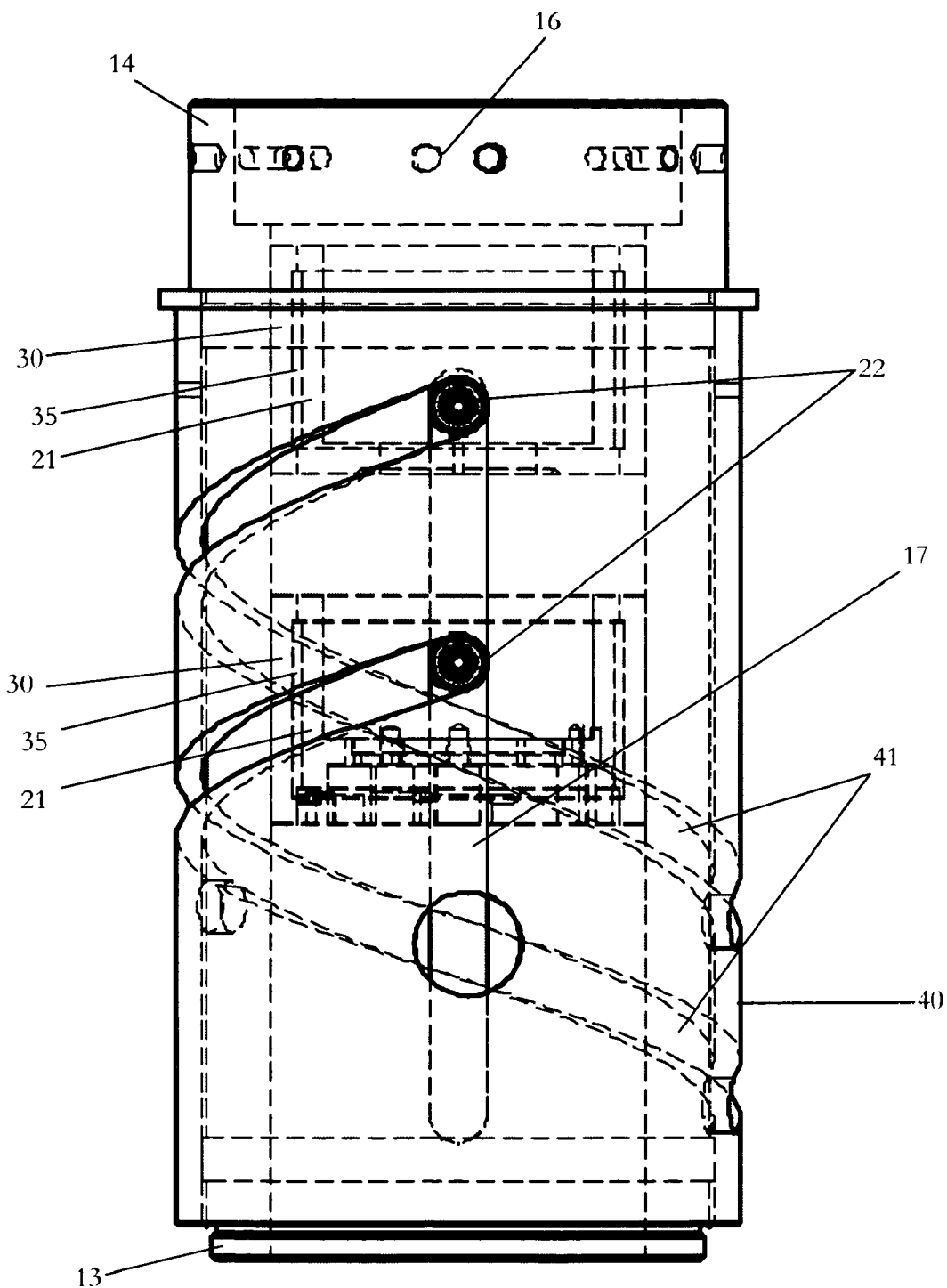
FIG. 4 is an elevation taken generally along the line 4-4 in FIG. 1 looking in the direction of the arrows, and illustrating the pins/air supply posts of the two lens housings mounted for adjustment in the lens barrel and the cams in which they sit according to embodiments.

This description sets forth an exemplary embodiment with reference to the accompanying Figures. This exemplary embodiment is not limiting, and variations are encompassed by embodiments.

Referring now to the drawings in which like reference numerals refer to like parts, an optical gaging/metrological apparatus (not shown) of variable magnification includes a mechanism for positioning and optical component control. The optical components of embodiments can include a zoom lens optical imaging system 1 comprising a tubular lens barrel 10 with an inner sleeve portion 12 extending between flanges 13, 14 formed on opposite ends of the barrel 10. The barrel 10 includes an inner bore wall 15, and a mounting formation 16 can be included in one of the flanges 14 for mounting a component (not shown), such as a front lens. The barrel 10, inner sleeve portion 12, flanges 13, 14, and inner bore wall 15 are all preferably coaxial in embodiments.

In embodiments, at least one substantially cylindrical lens housing or cell 21 mounted for axial adjustment within the bore of barrel 10. The lenses and mountings thereof in the housing(s) 21 may be of conventional design and therefore are not described in detail herein. In a manner to be described in greater detail, each lens housing 21 is supported by an air bearing 30 for axial adjustment in the lens barrel 10. Each housing 21 can employ the same type of air bearing 30 in the same fashion, so the mounting arrangement will be described in detail in connection with only one lens housing 21 for convenience.

Rotational motion between the at least one housing 21 and the barrel 10 is undesirable, so to prevent such rotational motion, a substantially cylindrical guide pin 22 is provided for each housing 21, each pin 22 being secured at one end to one of the housings 21. The other end of each pin 22 projects slidably into an elongate guide slot 17 in the inner sleeve portion 12 of the barrel 10, the elongated slot 17 allowing motion/extension of the lens (housings) 21 longitudinally within the barrel 10. Each of the pins 22 can additionally project beyond the slot 17 in the sleeve portion 12 of the barrel 10 and into a respective cam slot 41 formed in at least one zoom ring 40 rotatably mounted on the sleeve portion 12 of the barrel 10 for effecting axial adjustment of the housing 21 within the barrel 10. In such a formation, the pin 22 becomes a cam follower, the cam slot 41 of the zoom ring 40 being the cam. The zoom ring 40 is mounted on section 12 of the lens barrel 10 for rotation relative thereto in a known manner to effect corresponding axial movements of the lens housings 21 in barrel 10. While a single zoom ring 40 is shown in the FIGS. as operating two housings 21, it should be apparent that one ring 40 could be used for each lens housing 21. Further, it should also be apparent that only one or more than two lens housings 21 could be employed with corresponding guide pins 22, air bearings 30, and cam slots 41.

As noted above, embodiments improve upon the problems associated with mechanical bearings in a zoom lens system by using air bearings 30 in place of mechanical bearings. The air bearings 30 provide a fluid movement with more accurate positioning with negligible friction losses. To accomplish this, embodiments provide that the guide pin 22 of each housing 21 is hollow, with a feed tube 31 extending therethrough. Each guide pin 22 can be connected to an air supply 60 via a supply line 61. To enhance retention of the supply line 61 on the guide pin 22, ridges 62 can be formed on the guide pin 22. Since the pin 22 can move along the longitudinal axis of the optical system in the slot 17, the air supply lines 61 are preferably flexible enough to continue supplying air at all operating positions of the system.

The feed tube 31 conducts air from the supply line 61 to the air being 30 through the guide pins 22. Embodiments preferably employ porous media type air bearings for the air bearings 30, though air bearings of the orifice type can also be employed. Where porous media air bearings are used, the feed tube 31 delivers air to the porous medium 32, which conducts the air through itself and forms an air film 33 between an external surface 34 of the air bearing 30 and the inner surface 15 of the sleeve portion 12 of the barrel 10. Where orifice type air bearings are used, the feed tube 31 delivers air to an internal distribution system that conducts the air to one or more orifices 35 to form the air film 33 between the outer surface 34 of the air bearing 30 and the inner surface 15 of the barrel 10. As is known in the bearing art, the thin film 33 of pressurized air formed in the air bearing 30 supports a load, and, in this case, provides fluid, highly controlled movement. Air bearings are different from mechanical bearings in that there is no contact between the supported and supporting surfaces during operation. The thin film of pressurized air between these solid surfaces supplies the vehicle for force transfer.

Both the porous media and orifice types of air bearings are designed so that while air is constantly dissipating from the bearing site, pressurized air is flowing into the bearing to maintain the pressure and support the solid surfaces. In embodiments, the air dissipates through the film and pressurized air flows into the bearing via the feed tube 31. Air bearings thus provide a substantially frictionless load-bearing interface between surfaces that would otherwise be in contact with each other. Since air bearings are non-contact, they avoid the traditional bearing-related problems of friction, wear, and the need for a lubricant.

Figure 5:
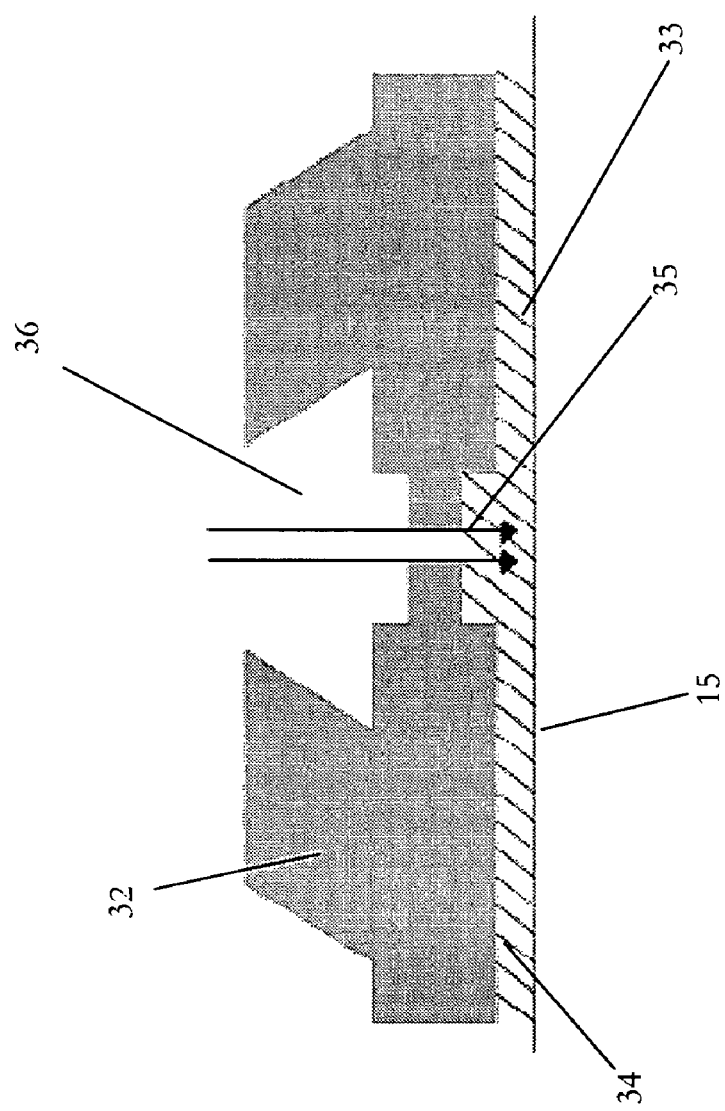
FIG. 5 shows a schematic diagram of an air bearing based guiding mechanism according to embodiments.
Figure 6:
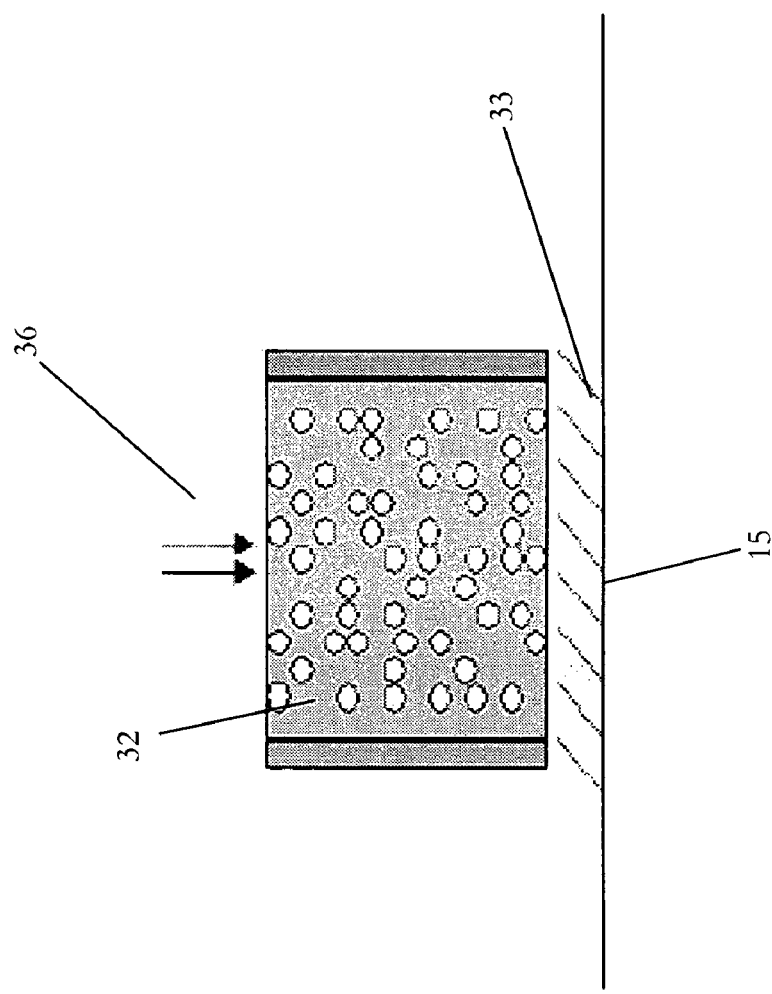
FIG. 6 shows a more detailed schematic diagram of another air beating of embodiments.

The air bearing 30 of embodiments can be mounted, for example, on the external surface a respective lens housing 21. Air from the supply 60 thus travels through the supply lines 61 through the pins/cams 22 to the air bearings 30, which maintain the housings 21 substantially at a desired distance from the barrel inner surface 15. Where the air bearings 30 are of the porous medium type, embodiments can have a ring of the porous medium 32 arranged on the external surface of each housing 21 with the air film side facing the inner surface 15 of the barrel 10. To ensure proper distribution of pressurized air to the porous medium, an air conduit 36 can be formed along an inner surface of the ring of porous medium and operatively connected to the air supply 60 via the pin 22. As seen in FIG. 6, the porous medium 32 conducts the air to its outer surface to form the air film between the external surface of the bearing 30 and the inner surface 15 of the barrel 10. In embodiments where the air bearings 30 are of the orifice type, the air bearings 30 can each include an air conduit 36 and a plurality of substantially equally-spaced orifices 35 directed at the barrel 10 to form the supportive air film 33, as seen in FIG. 5. To further enhance air film distribution, more than one ring can be used.

Figure 7:
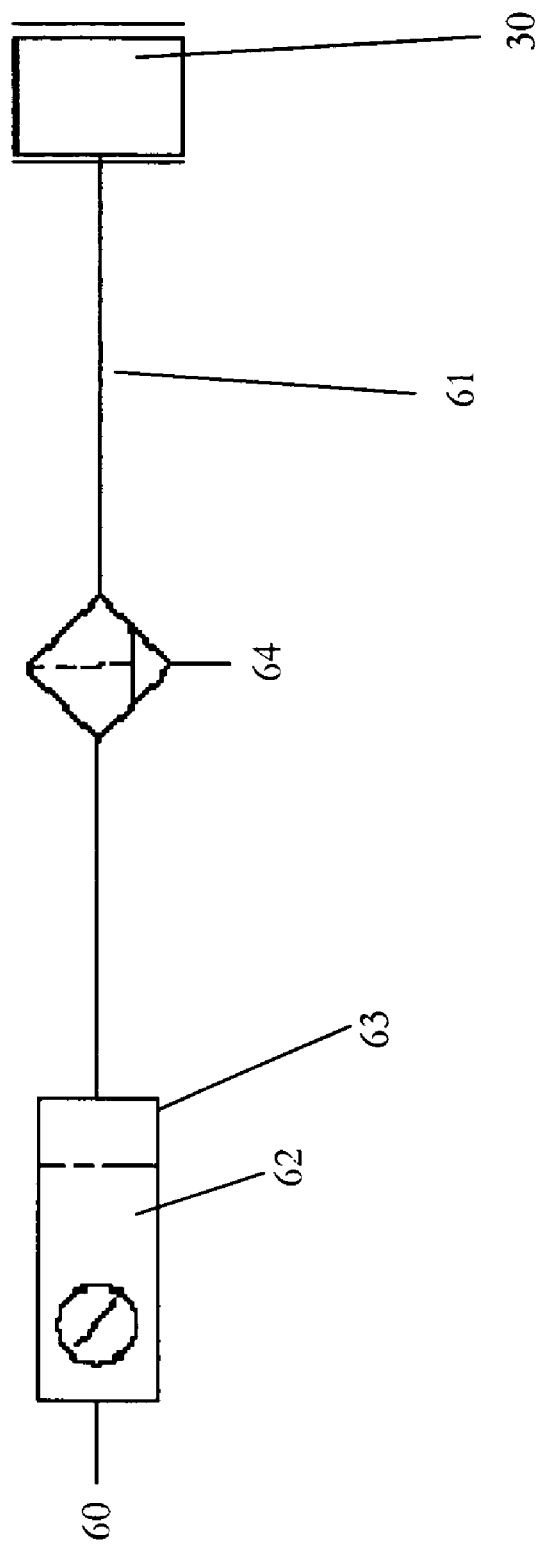
FIG. 7 shows a schematic diagram of an air supply system for an air bearing of embodiments.

An air supply, preferably a remote air supply 60, is fluidically connected to the air bearings via the cam followers/pins 22 extending through the slots in the barrel. The air supply in embodiments is controlled and monitored by a regulator 62 and filtered by a particle filter 63 to prevent contamination of the system. When the zoom ring 40 mounted on the barrel 10 rotates, the cam/slot 41 controls the axial position of the lens housing 21, resulting in longitudinal, reciprocal motion of the cam follower/pin 22. The longitudinal/reciprocal motion of the cam follower/pin 22 controls the magnification produced by the lens system. As seen, for example, in FIG. 7, an air supply system usable with embodiments can include a supply 60, such as a compressor, a regulator/coarse filter 62, 63, a fine filter 64, and supply lines 61.

From the foregoing it will be apparent that the present invention provides a very accurate and smooth mechanism or means for repeatedly and accurately adjusting the zoom lenses of the type carried by a housing 21 accurately to achieve the desired magnification and focus of the mechanism. The elimination of contact between the lens housings 21 and the barrel 10 not only reduces wear of the equipment during axial adjustment of the housings 21, but also reduces the effort required to make such adjustments and error introduced by contact. The air bearing arrangement of embodiments provides precision motion of the lens housings 21 without requiring the extremely hard, smooth contact surfaces and/or highly polished finish on the interior surface 15 of the barrel 10 necessary for the mechanical arrangements of the prior art.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A zoom lens system, comprising:
an annular air bearing having an inner wall defining an inner diameter of the bearing, and an outer wall defining a bearing surface through which air exits the bearing, the outer wall extending along substantially an entire length of the bearing and defining an outer diameter of the bearing; and
a lens assembly mounted within the inner wall and disposed along the inner diameter.

2. The system of claim 1, further including an inlet extending through the bearing surface through which air enters the bearing in a first direction, the bearing surface permitting air to exit the bearing, adjacent the inlet, in a direction opposite to the first direction.

3. The system of claim 1, wherein the outer wall is one of a porous element, and a nonporous element having at least one orifice extending therethrough.

4. The system of claim 1, further comprising a cylindrical sleeve having an inner surface, the air bearing being movably disposed within the sleeve, air exiting the bearing forming an air film between the bearing surface and the inner surface.

5. The system of claim 4, wherein the outer wall is disposed adjacent to the inner surface of the sleeve.

6. The system of claim 1, further comprising a fitting passing through the bearing surface and being connected to the inner wall.

7. The system of claim 6, wherein the fitting comprises a hollow pin through which air enters the bearing.

8. The system of claim 6, further comprising a fluid seal between the fitting and the outer wall.

9. The system of claim 6, further comprising a cylindrical sleeve defining a cam surface, the air bearing being movably disposed within the sleeve and the fitting engaging the cam surface.

10. A zoom lens system, comprising:
an annular air bearing having
an inner wall defining an inner diameter of the bearing, and
an outer wall extending substantially an entire length of the
bearing and defining an outer diameter of the bearing, the outer wall comprising a porous element; and
a lens assembly mounted to the inner wall and disposed along the inner diameter.

11. The system of claim 10, further comprising a fitting connected to the inner wall and passing through the porous element.

12. The system of claim 11, further including a fluid seal between the fitting and the porous element.

13. The system of claim 11, wherein the fitting permits air to enter the bearing in a first direction and the porous element permits air to exit the bearing, adjacent the fitting, in a second direction opposite to the first direction.

14. The system of claim 10, further comprising a cylindrical sleeve wherein the air bearing is movably disposed within the sleeve, air exiting the bearing forming an air film between the porous element and substantially an entire an inner circumference of the sleeve.

15. The system of claim 14, wherein the outer wall is disposed adjacent to the inner surface of the sleeve.

16. A method of supporting a lens assembly in a zoom lens system, comprising:
providing a sleeve;
directing air out of an annular air bearing through an outer wall extending along a length of the bearing; and
moving the lens assembly within a sleeve of the zoom lens system, wherein the lens assembly is mounted to an inner wall of the bearing and disposed along an inner diameter of the bearing.

17. The method of claim 16, further including forming a pressurized air film between the outer wall of the bearing and substantially an entire inner circumference of the sleeve.

18. The method of claim 16, wherein directing air out of the bearing comprises directing air through one of a porous element of the outer wall and an element of the outer wall comprising at least one orifice.

19. The method of claim 16, further including directing air into the bearing through an inlet in a first direction and directing air out of the bearing, adjacent the inlet, in a second direction opposite to the first direction.

20. The method of claim 16, further including directing air into the bearing through an inlet defined by a porous element of the outer wall.

21. A zoom lens system, comprising:
a sleeve having an inner surface and a cam surface;
a lens assembly within the sleeve;
an annular air bearing between the lens assembly and the sleeve and longitudinally movable within the sleeve, the air bearing having an outer wall comprising a porous surface disposed adjacent to the inner surface of the sleeve, and an inner wall adjacent the lens assembly; and
a hollow cam follower pin passing through the porous surface and connected to the inner wall, the pin engaging the cam surface and defining an air passage extending from outside the sleeve to within the air bearing, wherein air enters the bearing through the pin in a first direction and exits the bearing through the outer wall, adjacent the pin, in a direction opposite the first direction.

* * * * *